United States Patent Office 2,825,743
Patented Mar. 4, 1958

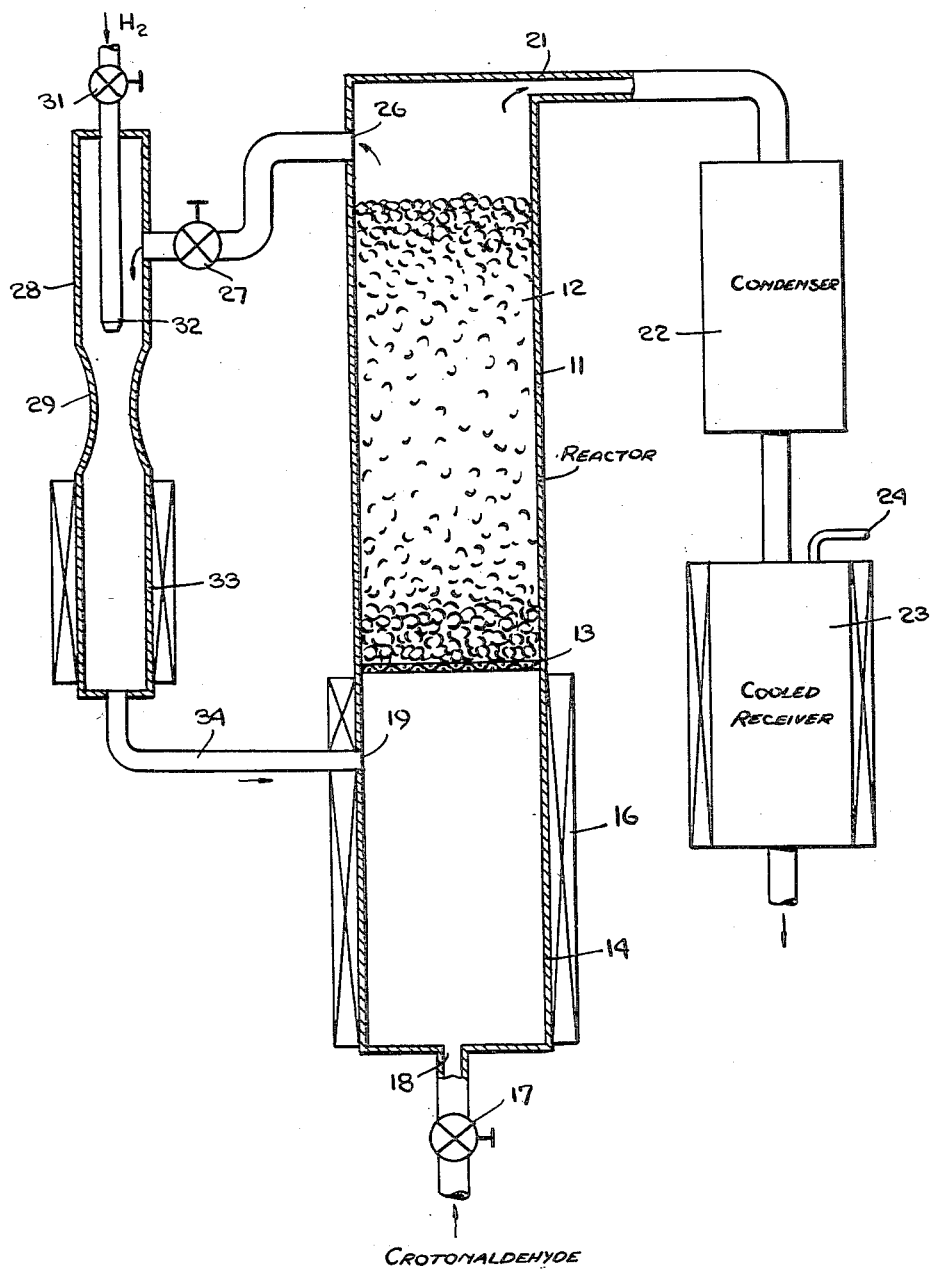

2,825,743

CATALYTIC HYDROGENATION OF UNSATURATED ALDEHYDES AND KETONES

Alexander F. MacLean and Charles C. Hobbs, Jr., Corpus Christi, Tex., assignors to Celanese Corporation of America, New York, N. Y., a corporation of Delaware Application August 30, 1955, Serial No. 531,426

14 Claims. (Cl. 260—593)

This application is a continuation-in-part of our co-pending application Serial No. 459,798, filed October 1, 1954, now abandoned.

This invention relates to reactions of ethylenically unsaturated carbonyl compounds and relates more particularly to the catalytic hydrogenation of such compounds.

It is an object of this invention to provide a novel process and apparatus for use in the catalytic hydrogenation of ethylenically unsaturated carbonyl compounds such as crotonaldehyde.

Another object of this invention is the provision of a new process and apparatus for carrying out the continuous catalytic hydrogenation of ethylenically unsaturated carbonyl compounds using a fixed bed of catalyst under such conditions that the catalyst has a long life and the ethylenically unsaturated carbonyl compound is converted in very high yields to saturated compounds such as saturated alcohols and saturated aldehydes.

In accordance with this invention the ethylenically unsaturated carbonyl compound and hydrogen are passed continuously through a fixed bed of a hydrogenation catalyst maintained at an elevated temperature. A portion of the whole of the reacted mixture emerging from the bed of catalyst is drawn off and the products of the reaction recovered therefrom, while the balance of the reacted mixture is recycled by mixing it with the fresh feed of the ethylenically unsaturated carbonyl compound and hydrogen. Advantageously, the portion which is recycled is larger than the portion which is drawn off.

The process of this invention has been found to be especially useful for the hydrogenation of α,β-ethylenically unsaturated carbonyl compounds. These include aliphatic aldehydes such as crotonaldehyde, acrolein, methacrolein, and 2-ethylhex-2-enal, aromatic aldehydes such as cinnamaldehyde, and ketones such as mesityl oxide and methyl vinyl ketone and methyl isopropenyl ketone.

A very satisfactory catalyst for use in the process of this invention is a copper catalyst, particularly a copper catalyst which contains oxides of elements such as chromium, barium, and zinc, which oxides act as promoters and stabilizers, as is well known in the art. Such a catalyst can be prepared by the reduction, as by means of hydrogen, of pellets of copper oxide or hydroxide mixed with said other oxides, or the corresponding hydroxides. It may also be prepared by reducing, with hydrogen, a coating comprising a mixture of said copper oxide or hydroxide and said other oxides or hydroxides, which mixture has been previously deposited on an inactive carrier, such as porous inert alumina or kieselguhr. Examples of other copper catalysts which have been employed successfully in the practice of this invention include the product obtained by reducing, with hydrogen, a mixture of cupric oxide and sodium silicate, said mixture containing, for example, 10 to 20% of sodium silicate.

In the practice of the process of this invention, the proportions of the reactants and the proportion of the reacted mixture which is recycled may be varied. Advantageously the molar ratio of hydrogen to ethylenically unsaturated carbonyl compound in the fresh feed ranges from about 1:1 to 80:1, while the proportion of the whole reacted mixture which is recycled is about 50 to 95% by weight of the total mixture emerging from the bed of catalyst.

In the preferred embodiment of this invention, in which a copper catalyst is employed, the temperature of the reaction mixture and catalyst is maintained below about 300° C., preferably below 260° C., but above 220° C. The recycling of a portion of the reaction products enables this temperature to be controlled uniformly and easily by regulation of the recycle rate.

The recycling of a portion of the whole of the reacted mixture may be carried out in any desired manner. Thus, the portion of the hot reacted mixture to be recycled may be drawn off from the reactor containing the bed of catalyst and blended with one or both of the fresh reactants, i. e. the hydrogen and the ethylenically unsaturated carbonyl compound, by means of a suitable pump. Advantageously this pump is in the form of a jet or aspirating device in which one or both of the reactants is passed at high speed through a Venturi tube and there are means connecting said Venturi tube to the outlet of the reactor so that a portion of the reacted mixture is sucked through the Venturi tube and intimately blended with the reactant or reactants. If desired, a stream of liquid ethylenically unsaturated carbonyl compounds may be sprayed into and volatilized in a stream of the hot reacted mixture being recycled, before or after the latter is mixed with the hydrogen.

Often two major products, a saturated aldehyde and a saturated alcohol, are produced by hydrogenation of the ethylenically unsaturated carbonyl compound in accordance with this invention. Thus, on hydrogenation of crotonaldehyde there are obtained both butanol and butyraldehyde. In order to increase the yield of one of the desired products it is advantageous to separate the other product therefrom and to recycle said other product, as by mixing it with the ethylenically unsaturated carbonyl compound being fed to the reactor. Thus, in the case of the hydrogenation of crotonaldehyde, the yield of butyraldehyde may be increased considerably by separating, as by a distillation procedure, the butanol from the condensed products of reaction and mixing the separated butanol with the fresh crotonaldehyde feed, preferably by mixing vapors of the butanol with vaporized crotonaldehyde. Conversely, the yield of butanol may be raised appreciably by separating the butyraldehyde from the condensed reaction products and returning this butyraldehyde to the reactor.

One embodiment of this invention is illustrated diagrammatically in the accompanying drawing which is a side view, with parts in cross-section, of an apparatus useful for the hydrogenation of ethylenically unsaturated carbonyl compounds.

Referring now to the drawing, reference numeral 11 designates a reactor which contains a bed 12 of solid finely divided catalyst supported on a screen or other foraminous element 13. Situated below the reactor 11 is a preheater 14, which is provided with a heating jacket 16, of any suitable type.

Vaporized crotonaldehyde, or other ethylenically unsaturated carbonyl compound, is fed into the preheater 14 through an adjustable valve 17 and inlet 18, while a mixture of hydrogen and recycled reacted mixture is fed into the preheater through an inlet 19. The resulting mixture of crotonaldehyde, hydrogen and recycyled reacted mixture passes from the preheater 14 through the bed 12 where the hydrogenation of the crotonaldehyde takes place. A portion of the hot reacted mixture passes through an outlet 21 to a condenser 22 and the resulting condensed liquid is collected in a cooled receiver 23 provided with a vent 24 for the uncondensed gases. Another portion of the hot reacted mixture passes through an outlet 26 through an adjustable valve 27 to an aspirator or jet pump 28 having a venturi section 29. Hydrogen under pressure is supplied to the interior of the jet pump 28 through an adjustable valve 31 and a nozzle 32, the passage of the hydrogen at high speed through the venturi section 29 serving to suck the hot reacted mixture into the jet pump 28. The resulting blend of hydrogen and reacted mixture passes through a heating zone 33 and a pipe 34 to the inlet 19. If desired, the reactor 11 may be provided with suitable heating or cooling means.

The following examples are given to illustrate this invention further.

Example I

Crotonaldehyde containing 6.5% by weight of water is hydrogenated continuously in an apparatus of the type shown in the drawing. Throughout the reaction three moles of hydrogen are fed for each mole of crotonaldehyde supplied while the volumetric ratio of recycled hot reacted mixture to hydrogen is maintained at about 5:1, so that about ⅘ of the whole reacted mixture emerging from the bed of catalyst is recycled. The blend of reactants and reacted mixture is heated to a temperature of 190 to 210° C. and then passed upward through a hot catalyst bed of uniform diameter. The catalyst bed comprises tablets of porous inert alumina ⅛ x ⅛" in size coated with a mixture of 4.8%, based on the weight of the coated particles, of freshly reduced copper, and 0.45%, based on the weight of the coated particles, of chromic oxide. The space velocity (in terms of volumes of reactants, at standard conditions per bulk volume of catalyst per hour) is 575 hour$^{-1}$. During the reaction the temperature in the catalyst bed is measured at various points along the path of the reactants through the catalyst. After 1 hour of operation the maximum temperature in the catalyst bed is about 250° C. and this temperature is attained at a point about ¼ the height of the catalyst bed measured from the bottom of said bed. The temperatures below and above this point are lower than 250° C., indicating that reaction is essentially complete at this point, the fall in temperature above this point being due to losses of heat to the atmosphere, as by radiaion. After 4 hours of operation the maximum temperature is still about 250° C. and occurs at the same point, while after 90 hours of operation the maximum temperature is about 235° C. and occurs at the same point. The portion of the reacted mixture which is not recycled is withdrawn continuously, condensed at a temperature of 8° C., and separated into butanol and butyraldehyde by distillation. Throughout the run, the extent of conversion of the crotonaldehyde to butyraldehyde and butanol remains constant at 99%.

Example II

Example I is repeated under identical conditions except that the valve 27 (see the drawing) is closed so that no recycling of the reacted mixture occurs. The reactants are fed to the reactor at the same rate as in Example I but are heated to temperatures of 140 to 160° C. before entering the bed of catalyst. Measurements of the temperature during the continuous operation show a maximum temperature of 340° C. at first, falling to 320° C. after 41 hours, and show that the point of maximum temperature moves upward through the catalyst bed, indicating progressive deactivation of the lower portions of the bed. During 41 hours of operation the extent of conversion of crotonaldehyde to butyraldehyde and butanol remains at 99% but after 48½ hours it drops to 64.3%.

Example III

Mesityl oxide containing 2.1% of water is hydrogenated continuously in an apparatus of the type shown in the drawing. The condensed reaction product obtained from the receiver is distilled to separate the methyl isobutyl ketone from the methyl isobutyl carbinol. All of the latter is returned to the reactor by mixing it with the mesityl oxide feed. Throughout the reaction three moles of hydrogen are fed for each mole of mesityl oxide. The volumetric ratio of recycled hot reacted mixture to hydrogen is maintained at about 5:1 so that ⅘ of the whole reacted mixture emerging from the bed of catalyst is recycled without separation. The blend of reactants and reacted mixture is heated to a temperature of 160 to 190° C., and then passed upward through the hot catalyst bed which is identical with that of Example I. The space velocity (in terms of volumes of hydrogen and fresh mesityl oxide at standard conditions per bulk volume of catalyst per hour) is 585 hour$^{-1}$. The maximum temperature attained in the reactor is 300° C. The yield of methyl isobutyl ketone is substantially quantitative.

Example IV

Crotonaldehyde containing 6.5% of water is hydrogenated continuously in an apparatus of the type shown in the drawing. The condensed reaction product obtained from the receiver is distilled to separate the butyraldehyde from the butanol. All of the butyraldehyde is returned to the reactor by mixing it with the crotonaldehyde feed. Throughout the reaction 10 moles of hydrogen are fed for each mole of crotonaldehyde. The volumetric ratio of recycled hot reacted mixture to hydrogen is maintained in the neighborhood of 3.25:1. The blend of reactants and reacted mixture is heated to a temperature of 160 to 190° C. and then passed upward through the hot catalyst bed which is identical with that of Example I. The space velocity (in terms of volumes of hydrogen and fresh crotonaldehyde at standard conditions per bulk volume of catalyst per hour) is 1550 hour$^{-1}$. The maximum temperature attained in the reactor is 250° C. The yield of butanol and the efficiency of conversion to butanol are substantially quantitative.

Example V

Crotonaldehyde containing 6.5% of water is hydrogenated continuously in an apparatus of the type shown in the drawing. The condensed reaction product obtained from the receiver is distilled to separate the butyraldehyde from the butanol. All of the butanol is returned to the reactor by mixing it with the crotonaldehyde feed. Throughout the reaction 1.6 moles of hydrogen are fed for each mole of crotonaldehyde. The volumetric ratio of recycled hot reacted mixture to hydrogen is maintained at about 6.3:1. The blend of reactants and reacted mixture is heated to a temperature of 160 to 190° C. and then passed upward through the hot catalyst bed which is identical with that of Example I. The space velocity (in terms of volumes of hydrogen and fresh crotonaldehyde at standard conditions per bulk volume of catalyst per hour) is 360 hour$^{-1}$. When the volume of separated recycled butanol is considered, the space velocity (in terms of volumes of hydrogen, fresh crotonaldehyde and separated recycled butanol at standard conditions) is in the neighborhood of 420 hour$^{-1}$. The maximum temperature attained in the reactor is 265° C. The yield of butyraldehyde and the efficiency of conversion to butyraldehyde are substantially quantitative.

It is to be understood that the foregoing detailed description is merely given by way of illustration and that many variations may be made therein without departing from the spirit of our invention.

Having described our invention, what we desire to secure by Letters Patent is:

1. Process for the hydrogenation of unsaturated compounds which comprises continuously passing a feed of hydrogen and an ethylenically unsaturated carbonyl compound selected from the group consisting of aldehydes and ketones into contact with a bed of catalyst for the hydrogenation of said compound in a reaction zone and recycling a part of the whole reacted mixture leaving the bed to the reaction zone by mixing said part with said feed, said part and said whole being of the same composition.

2. Process for the hydrogenation of unsaturated compounds which comprises continuously passing a gaseous feed of hydrogen and an $\alpha,\beta$-ethylenically unsaturated carbonyl compound chosen from the group consisting of aldehydes and ketones into contact with a bed of catalyst for the hydrogenation of said compound in a reaction zone and recycling a part of the whole reacted mixture leaving the bed to the reaction zone by mixing said part with said feed, said part and said whole being of the same composition.

3. Process for the hydrogenation of unsaturated compounds which comprises continuously passing a feed of hydrogen and an ethylenically unsaturated carbonyl compound chosen from the group consisting of aldehydes and ketones into contact with a bed of catalyst for the hydrogenation of said compound in a reaction zone and recycling a part of the whole reacted mixture leaving the bed to the reaction zone by mixing said part with said feed while withdrawing the remainder of said reacted mixture from the reaction zone, said part and said whole being of the same composition, said remainder comprising as products a saturated alcohol and a saturated carbonyl compound, recovering one of said products from said remainder and recycling the other of said products by mixing it with said feed.

4. Process for the hydrogenation of unsaturated compounds which comprises continuously passing a feed of hydrogen and an $\alpha,\beta$-ethylenically unsaturated carbonyl compound chosen from the group consisting of aldehydes and ketones into contact with a bed of catalyst for the hydrogenation of said compound in a reaction zone and recycling a part of the whole reacted mixture leaving the bed to the reaction zone by mixing said part with said feed while withdrawing the remainder of said reacted mixture from the reaction zone, said part and said whole being of the same composition, said remainder comprising as products a saturated alcohol and a saturated carbonyl compound, recovering said alcohol from said remainder, and recycling said saturated carbonyl compound by mixing it with said feed.

5. Process for the hydrogenation of unsaturated compounds which comprises continuously passing a feed of hydrogen and an $\alpha,\beta$-ethylenically unsaturated carbonyl compound chosen from the group consisting of aldehydes and ketones into contact with a bed of catalyst for the hydrogenation of said compound in a reaction zone and recycling a part of the whole reacted mixture leaving the bed to the reaction zone by mixing said part with said feed while withdrawing the remainder of said reacted mixture from the reaction zone, said part and said whole being of the same composition, said remainder comprising as products a saturated alcohol and a saturated carbonyl compound, recovering said saturated carbonyl compound from said remainder, and recycling said alcohol by mixing it with said feed.

6. Process as set forth in claim 1 in which about 50 to 95% of the whole reacted mixture leaving the reaction zone is recycled.

7. Process as set forth in claim 2 in which the unsaturated carbonyl compound is crotonaldehyde.

8. Process as set forth in claim 2 in which the unsaturated carbonyl compound is mesityl oxide.

9. Process for the hydrogenation of crotonaldehyde which comprises continuously passing a gaseous feed of hydrogen and crotonaldehyde into contact with a fixed bed of a catalyst for the hydrogenation of the crotonaldehyde in a reaction zone and recycling a major part of the whole gaseous reacted mixture leaving the reaction zone by mixing said part with said feed while withdrawing the remainder of said reacted mixture from the reaction zone and recovering butanol and butyraldehyde from said remainder, said part and said whole being of the same composition.

10. Process as set forth in claim 9 in which said catalyst is a copper base catalyst.

11. Process as set forth in claim 10 in which the temperature in the catalyst bed is not above 300° C.

12. Process for the hydrogenation of crotonaldehyde which comprises passing a gaseous feed of hydrogen and crotonaldehyde through a bed of a solid copper base catalyst for the hydrogenation of the crotonaldehyde in a reaction zone at a temperature of about 220 to 300° C. and recycling part of the whole hot gaseous reacted mixture leaving the reaction zone by mixing 50 to 95% of said whole hot gaseous reacted mixture with said feed while withdrawing the remainder of said reacted mixture from the reaction zone and recovering butanol and butyraldehyde from said remainder.

13. Process for the hydrogenation of crotonaldehyde which comprises continuously passing a gaseous feed of hydrogen and crotonaldehyde into contact with a fixed bed of a catalyst for the hydrogenation of the crotonaldehyde in a reaction zone and recycling a major part of the whole gaseous reacted mixture leaving said bed to the reaction zone by mixing said part with said feed while withdrawing the remainder of said reacted mixture from the reaction zone, said part of and said whole hot gaseous reacted mixture having the same composition, said remainder comprising butanol and butyraldehyde, recovering butyraldehyde and butanol from said remainder and recycling the butyraldehyde by mixing it with said feed.

14. Process for the hydrogenation of crotonaldehyde which comprises continuously passing a gaseous feed of at least three parts of hydrogen with each one part of crotonaldehyde into contact with a fixed bed of a catalyst for the hydrogenation of the crotonaldehyde in a reaction zone and recycling a major part of the whole gaseous reacted mixture leaving the reaction zone by mixing said part with said feed while withdrawing the remainder of said reacted mixture from the reaction zone, said part of and said whole gaseous mixture having the same composition, said remainder comprising butanol and butyraldehyde, recovering butyraldehyde and butanol from said remainder and recycling the butanol by mixing it with said feed.

References Cited in the file of this patent

UNITED STATES PATENTS

| | | |
|---|---|---|
| 2,367,078 | Weizmann | Jan. 9, 1945 |
| 2,501,708 | Bewley et al. | Mar. 28, 1950 |
| 2,658,921 | Alheritiere | Nov. 10, 1953 |